United States Patent [19]
Sandier et al.

[11] 3,869,607
[45] Mar. 4, 1975

[54] RADIOACTIVE MEANS FOR MEASURING DISTANCE INTERVALS BETWEEN ANOMALIES IN AN EARTH FORMATION

[75] Inventors: Gerard Sandier, Paris; Jean-Paul Nels, Limours, both of France

[73] Assignee: Schlumberger Technology Corporation, New York, N.Y.

[22] Filed: July 13, 1973

[21] Appl. No.: 379,168

[30] Foreign Application Priority Data
July 13, 1972   France .............................. 72.25508

[52] U.S. Cl. ................................. 250/266, 250/260
[51] Int. Cl. ............................................ G01v 5/00
[58] Field of Search ............ 250/259, 260, 262, 264, 250/265, 266

[56] References Cited
UNITED STATES PATENTS
2,785,315   3/1957   Goodman ........................... 250/260
3,784,822   1/1974   Schuster ............................ 250/266

*Primary Examiner*—Archie R. Borchelt
*Attorney, Agent, or Firm*—Cooper, Dunham, Clark, Griffin & Moran

[57] ABSTRACT

In Earth formation measurements, an investigating tool having a first and a second detector at a relatively small spacing from each other and a third detector at a relatively great spacing from the first and second detectors is moved through a borehole having anomalies such as radioactive bullets or casing joints which are relatively uniformly spaced from each other by a distance which is of the order of said great spacing between the third detector and the first and second detectors. The first and second detectors generate detection signal peaks for the same anomaly within a short time interval, and the third detector generates a detection signal peak for an adjacent anomaly at about the same time. By means of a defined apparatus, electrical signals representing the times of occurrence of the detection signal peaks from the first and second detectors for the same anomaly and the known small spacing between these detectors are used to obtain an electrical signal for the speed of the investigating tool at that time, and at least some of these electrical signals are combined with electrical signals representing the time of occurrence of the detection signal peak from the third detector for an adjacent anomaly and at least one of the known distances between the detectors to thereby obtain an accurate measure of the distance interval between the pair of adjacent anomalies. Provisions are made for detecting the most representative point of a detection signal peak, for accommodating irregularities in the occurrence of detection signal peaks resulting from anomalies which are not uniformly spaced or which do not provide an adequate detection signal peak, and for utilizing, in the last-mentioned combining operation, either the distance between the first and the third detectors or the distance between the second and third detectors, whichever would give a more accurate measurement of the distance between the particular pair of adjacent anomalies. The invented technique can be used to find the actual average speed of the tool within any time interval between the times of detection of any suitable formation anomaly by two spaced-apart detectors.

21 Claims, 21 Drawing Figures

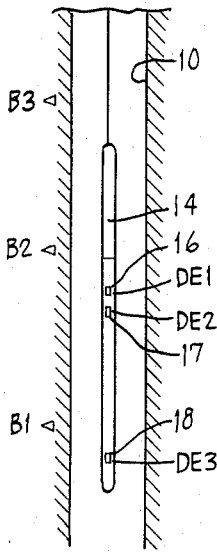
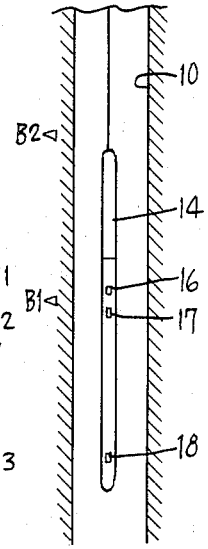
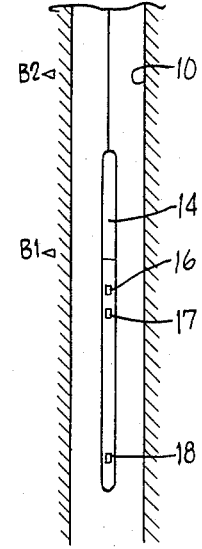
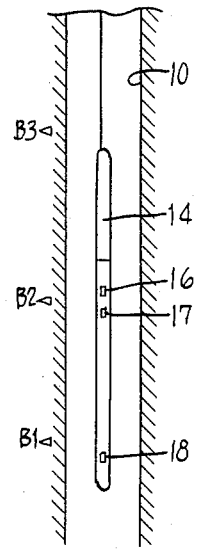
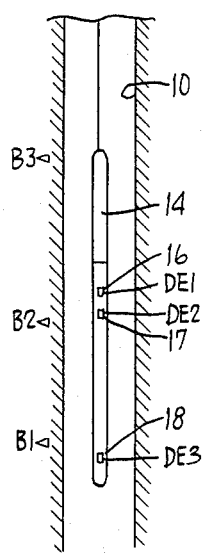
Fig. 7A. Fig. 7B. Fig. 7C. Fig. 7D. Fig. 7E.
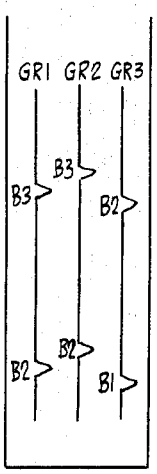
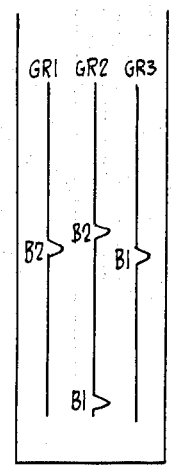
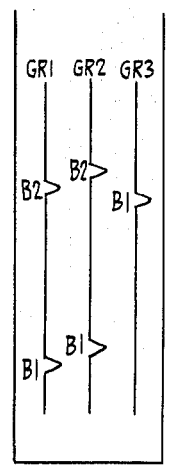
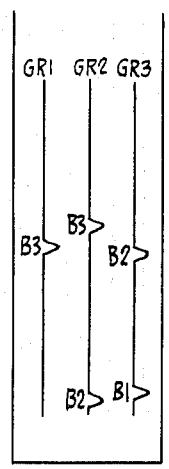
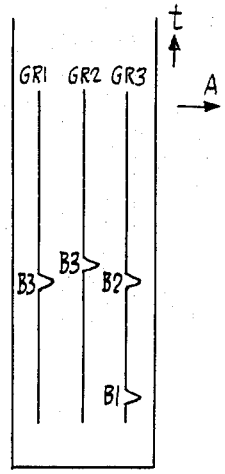
Fig. 8A. Fig. 8B. Fig. 8C. Fig. 8D. Fig. 8E.

RADIOACTIVE MEANS FOR MEASURING DISTANCE INTERVALS BETWEEN ANOMALIES IN AN EARTH FORMATION

BACKGROUND OF THE INVENTION

The invention is in the field of Earth formation measurements, such as subsidence measurements which involve finding the distance intervals between anomalies in an Earth formation and comparing the findings with earlier measurements to see if any changes have taken place in the time span between the two measurements. The anomalies may be radioactive bullets fired at regular distance intervals along a borehole through the Earth formation of interest, the joints of a casing inserted into the borehole, or other suitable anomalies. The invention is also in the field of measuring the true speed of an investigating tool moving along a borehole.

Earth formation subsidence occurs generally as a result of the extraction of fluids from the formation, such as the extraction of water or oil, and the importance of measuring subsidence has been known for a long time. An example of a well known case of Earth formation subsidence is the Italian city of Venice which is sinking at an alarming rate as a result of the extraction of subsurface water.

In measuring Earth formation subsidence, a technique has been developed of placing radioactive bullets at substantially regular distance intervals from each other in a borehole and of measuring from time to time the intervals between adjacent bullets by lowering into the borehole an investigating tool that includes radioactivity detectors. Since the radioactive bullets follow the movements of the Earth formation in which they are placed, any changes with time of the intervals between adjacent bullets indicate subsidence. Similar results may be obtained by measuring from time to time the intervals between the casing joints of cased boreholes, or by measuring other anomalies in the Earth formation, where changes in the distances between adjacent anomalies are indicative of subsidence.

Since Earth formation subsidence is generally a gradual phenomenon, with small changes over long periods of time, it is essential that the measurements of the distances of interest be highly accurate. For example, a change of a few inches between two adjacent anomalies over a period of time may be highly significant.

In conventional techniques, the instantaneous location of the borehole investigating tool is determined by keeping track at the Earth surface of the movement of the cable that suspends the tool. This technique introduces errors stemming mainly from the inherent inaccuracy of cable movement measurements and from the difference between the movement of the cable at the surface and at the investigating tool. For example, the cable has a certain elasticity and is subject to a varying tensile stress as the investigating tool rubs against the borehole wall. Thus, even if the cable is reeled at a constant speed at the Earth surface, the investigating tool may in fact be moving at a different speed at any particular time. These variations in the speed of the investigating tool, which are commonly called "yo-yo" movements are practically impossible to eliminate.

There is a prior art investigating tool that makes it possible to considerably reduce the measurement errors which are due to the yo-yo movements of the investigating tool. This tool includes three gamma ray radioactivity detectors mounted on a body member having a low expansion coefficient, for example, a body member made of a material known as INVAR. The first and second detectors are at a relatively small spacing from each other, while the second and third detectors are spaced from each other by a relatively great distance which is of the order of the average expected distance between adjacent readioactive bullets. Because of this relative spacing, the first and second detectors pass a bullet within a very short time interval and the third detector passes an adjacent bullet at about the same time. Since the spacing between the first and the second detectors can be measured fairly accurately, and since the time interval within which the first and the second detectors pass the same bullets is reasonably short, a calculation of the average speed of the investigating tool within that time interval is a fairly accurate measure of the actual speed of the investigating tool and, since the third detector is expected to pass an adjacent bullet at about that time, the calculated speed of the investigating tool may be utilized in calculating the actual distance interval between the two adjacent bullets. By using this method, a substantial portion of the errors which would result from simply measuring the cable movements at the Earth surface can be avoided. Moreover, to reduce the yo-yo movements of the investigating tool, a very low average cable speed may be used.

In order to calculate the distance between two adjacent bullets by this technique, the known distance between the second and the third detectors is added to the distance over which the investigating tool moves upwardly within the borehole between the time the third detector passes a bullet and the time the second detector passes the adjacent upper bullet. The travelled distance which is to be added is calculated by using the average speed calculated as discussed above.

The calculations described above would be relatively simple and accurate if the distance intervals between bullets were reasonably uniform and if the peaks of the signals obtained from the detectors passing the radioactive bullets had a reasonably uniform amplitude and shape. The fact is, however, that radioactive bullets penetrate to very different depths in the Earth formation depending on the formation characteristics. Certain bullets do not penetrate at all in certain hard rocks, while certain other bullets penetrate too deeply into soft rocks to be detected by the investigating tool, or give out signals that can not be distinquished unambiguously from ambient noise. If additional bullets are fired to fill in the gaps of bullets that can not be detected, the result may be bullets which are too close to each other. Thus, it is possible in a real life situation that the investigating tool will encounter locations which correspond to missing bullets or will encounter additional bullets. Moreover, the tool may encounter bullets which give out a signal that can not be differentiated unambiguously from noise. Similar real life difficulties are encountered when casing joints, rather than radioactive bullets, are detected.

The simple and straightforward technique described above can not accommodate these real life situations, and an object of the subject invention is to provide for measurements of Earth formations and of distance intervals between certain anomalies in an object that take into account the irregularities and difficulties discussed above and still provide accurate results.

SUMMARY OF THE INVENTION

The invention is in the field of Earth formation measurements, such as measuring the distance between anomalies in an object and measuring the true speed of an investigation tool moved along a borehole traversing a formation. A specific aspect of the invention is in the field of measuring Earth formation subsidence by measuring the distance intervals between borehole anomalies such as radioactive bullets fired at a substantially uniform pattern in the borehole walls or between borehole casing joints.

An object of the invention is to provide accurate measurements even in cases where the anomalies are not in a perfectly uniform pattern, where the detectors can not detect unambiguously some of the anomalies and where the detection of certain anomalies provides detection signals that are different from other detection signals.

In one example of carrying out certain aspect of the invention, an investigating tool is suspended on a cable in a borehole in a conventional manner and is then slowly and steadily moved along the borehole, for example, by being drawn up. The borehole has a succession of substantially uniform anomalies, such as a succession of radioactive bullets fired at substantially regular distance intervals from each other into the borehole walls, or a succession of joints between substantially identical casing sections. The investigating tool has at one of its ends, for example at its upper end, a first and a second anomaly detectors which are at a relatively small spacing from each other, and has at its lower end a third detector which is at a relatively great spacing from the first and second detectors, said relatively great spacing being of the order of the expected distance interval between two adjacent anomalies.

As the investigating tool moves up along the borehole, the first and the second detectors pass the same anomaly within a relatively short time interval and generate a first and a second detection signal peaks. Meanwhile, at about the same time interval, the third detector passes the next lower anomaly and generates a third detection signal peak. The times of occurrence of the first and second detection signals and the known small spacing between the first and the second detectors may be combined, by a defined apparatus, to obtain a measure of the average speed of the investigating tool at the time interval of interest. Then, assuming that the third detection signal occurred at about the same time interval, the time of occurrence of the third detection signal peak with respect to the first two peaks, the known spacings between the three detectors and the obtained measure of speed of the investigating tool at the time interval of interest may be combined, by means of a defined apparatus, to obtain accurately the distance between the two adjacent anomalies.

Because the distance intervals between adjacent anomalies are not always substantially the same, and because the detection signal peaks provided by the detectors are not always unambiguous, the subject invention provides novel techniques for obtaining accurate results despite possible irregularities in the intervals between anomalies and in the detection signal peaks. To this end, the peaks provided by each detector are examined to determine the position of a point of each peak which is of optimal significance, and the peaks are further examined to determine whether it may be necessary to rearrange these peaks so that their relative positions have optimal significance, and if so, how they should be rearranged. Then, the relative positions of the peaks, after a possible rearrangement of these peaks, are utilized in accordance with the invention to find the intervals between adjacent anomalies in an optimally accurate manner.

The aspect of the invention that relates to finding the true speed of the investigating tool has an independent significance. The true speed, for each of a succession of short time intervals, is found by examining pairs of peaks, each pair resulting from the detection of the same anomaly by each of two detectors, and combining signals representing the time of occurrence of the peaks of each pair with the known spacing between the detectors. The detected anomalies may be any clearly identifiable anomalies in the Earth formation, and need not be in a uniform pattern.

BRIEF DESCRIPTION OF THE DRAWINGS

FIGS. 7A through 7E illustrate several possible relative positions between the detectors of an investigating tool and a pair of adjacent anomalies in the borehole.

FIGS. 8A through 8E each illustrate typical graphs of the signals from the detectors for the corresponding positions of the tool in FIGS. 7A through 7E.

DETAILED DESCRIPTION

The invention is described in detail here as applied to Earth formation subsidence measurements involving measuring the distance intervals between adjacent radioactive bullets fired in a borehole, but it should be clear that the invention is applicable to other types of Earth formation measurements, such as measurements which may involve finding the distance between joints in the casing of a borehole, or to measurements of the distance intervals between anomalies in other suitable objects, or of the true speed of an investigating tool.

Figure 1:
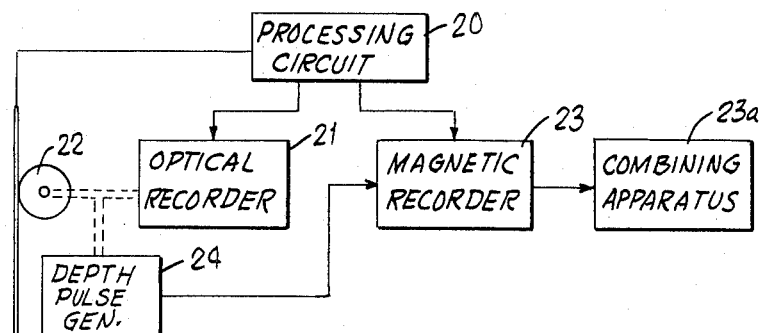
FIG. 1 shows schematically a three-detector investigating tool suspended in a borehole by a cable and Earth surface apparatus for combining measurements derived by the investigating tool to obtain true speed of the tool and the distance intervals between borehole anomalies.

Referring to FIG. 1, a borehole 10 tranverses an Earth formation 12, and may be provided with a casing 11. Radioactive bullets 13 have been placed in the Earth formation 12 surrounding the borehole 10 at substantially uniform distance intervals, for example, every 11 meters. The placing of the bullets 13 need not be very accurate, and the intervals between adjacent bullets 13 may vary by 1 or 2 meters without undesirable effects on the measurement accuracy. An investigating tool 14 is suspended by a cable 15 which can be reeled at the Earth surface by a conventional winch mechanism (not shown). The tool 14 comprises a body member made of a metal with a very low expansion coefficient, for example, INVAR, and carries three gamma ray detectors 16, 17, and 18. The first and second detectors 16 and 17 are at a defined relatively small spacing from each other, while the third detector 18 is at a defined relatively great spacing from the first and the second detectors 16 and 17. For example, the spacing AS between the first and the second detectors 16 and 17 may be about 1 meter, while the spacing BS between the second and third detectors 17 and 18 may be about 10.5 meters, which is of the order of the average distance interval between the bullets 13. The exact spacings between the detectors must be known.

The investigating tool 14 is slowly drawn up along the borehole, and each of the detectors 16, 17, and 18 generates output pulses as it passes a radioactive bullet 13. These output pulses are transmitted to the surface via suitable conductors comprising a part of the cable 15, and are applied to a processing circuit 20 which generates three signals, each of the signals being a function of the radioactivity detected by one of the detectors 16, 17, and 18. A first signal from the processing circuit 20 is a function of the radioactivity detected by the first detector 16, a second signal is a function of the radioactivity detected by the second detector 17 and a third signal is a function of the radioactivity detected by the third detector 18. The signals have amplitude peaks corresponding to the detection of bullets. These signals from the processing circuit 20 are recorded in graph form by an optical recorder 21 driven in synchronism with the movement of the cable 15 at the Earth surface by a tangent friction wheel 22. The same three signals from the processing circuit 20 are sampled and are recorded in digital form by a magnetic recorder 23 whose operation and tape speed are controlled by a depth pulse generator 24 driven by the tangent wheel 22. Each of the three signals from the processing circuit 20 is sampled at a rate which is determined by the rate of the pulses from the generator 24, and the samples of each of the three signals are recorded on tape. The recorded signals are combined according to the invention by apparatus 23a as described below.

Figure 2:
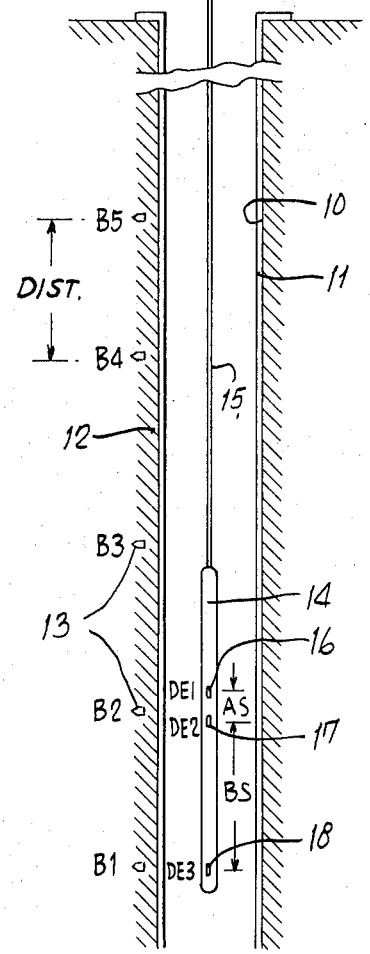
FIG. 2 illustrates a portion of a typical graph recording of the signals generated by the three detectors of the investigating tool of FIG. 1.
Figure 2:
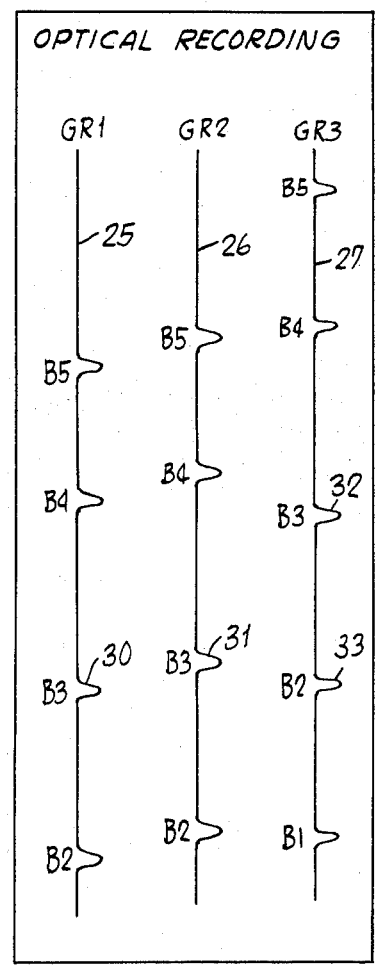

Referring to FIG. 2, the graphical recording obtained by the recorder 21 of FIG. 1 is presented in the form of three curves 25, 26, and 27 corresponding respectively to the three detectors 16, 17, and 18. In the recording of FIG. 2. depth decreases and time increases in the upward direction, and amplitude increases in the right-hand direction. Each of the curves 25, 26, and 27 has a certain number of peaks, with each peak corresponding to a detected increase in radioactivity.

If the vertical dimension of the FIG. 2 graph is exactly proportional to the actual speed of the tool 14, the vertical distance in FIG. 2 between two peaks that result from the same bullet 13, e.g., between the peaks 30 and 31, should be exactly proportional to the small spacing AS between the detectors 16 and 17. Under the same conditions, the distance in FIG. 2 between two peaks corresponding to the detection of a bullet 13 by the detector 17 and by the detector 18, e.g., between the peaks 31 and 32 in FIG. 2, should be exactly proportional to the spacing BS between the detectors 17 and 18. In fact, however, the actual movement of the tool 14 differs from that of the cable 15 at the friction wheel 22. Absent some special technique for depth correction, the vertical scale of the graphs of FIG. 2 is defined only by the rotational speed of the wheel 22, while the occurrence of the peaks of the graphs of FIG. 2 is determined by the actual position of the tool 14. Thus, the distances between the peaks of FIG. 2 discussed above are not in fact exactly proportional to the spacings AS and BS between the detectors 16, 17, and 18.

Figure 3:
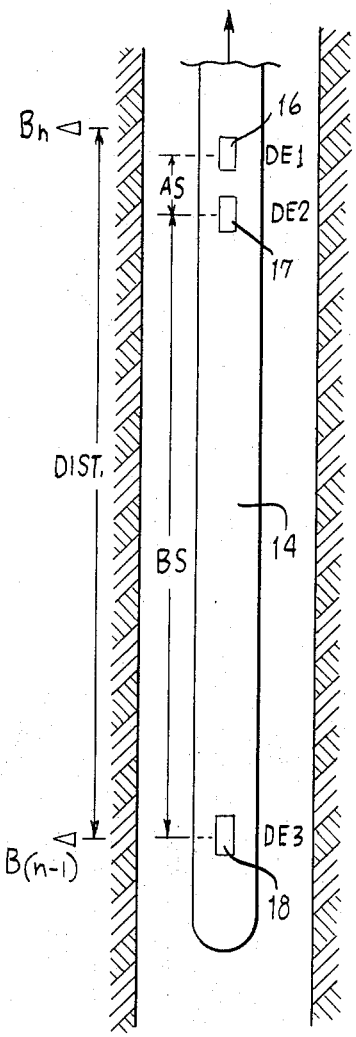
FIG. 3 is an enlarged schematic view of the investigating tool of FIG. 1.
Figure 4:
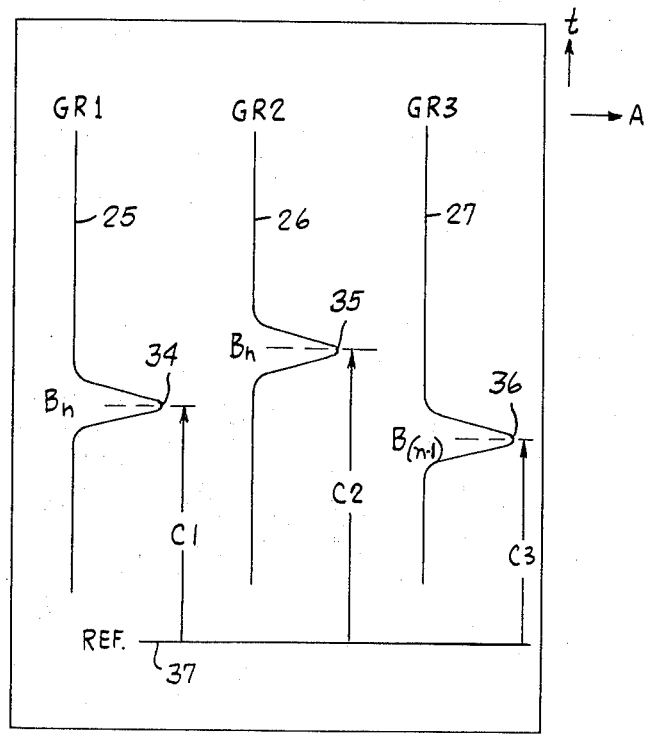
FIG. 4 is an enlarged partial view of graphs of the type shown in FIG. 2.

One observation that may be made from examining FIGS. 3 and 4 is that the curves 25, 26, and 27 are expected to have, at substantially the same level, three peaks, e.g., 30, 31, and 33, that correspond respectively to the detection of a bullet by the first and the second detectors 16 and 17 and to the detection of the next lower bullet by the third detector 18. This is because of the particular choice of spacing between the detectors 16, 17, and 18 in the example represented in FIGS. 3 and 4, and because of the substantially uniform distances between the radioactive bullets 13. In the description here, the upward direction is taken as the positive direction, and the graph peaks and the bullets 13 are numbered from the bottom up.

Referring to FIGS. 3 and 4, the tool 14 is moving upwardly, such that the dtectors 16 and 17 would pass a bullet $B_n$ and the detector 18 would pass the next lower bullet $B_{(n-1)}$. The resulting peaks are shown in FIG. 4, with the peak 34 corresponding to the detection of the bullet $B_n$ by the detector 16, the peak 35 corresponding to the detection of the same bullet $B_n$ by the detector 17 and the peak 36 corresponding to the detection of the bullet $B_{(n-1)}$ by the detector 18. The distance interval DIST between the bullets $B_n$ and $B_{(n-1)}$ is equal to the sum of the spacing BS between the detectors 17 and 18, the spacing AS between the detectors 16 and 17 and the distance travelled upwardly by the tool 14 between the detection of the bullet $B_{(n-1)}$ by the detector 18 and the detection of the bullet $B_n$ by the detector 16. The same distance interval DIST may be expressed as the sum of the spacing BS between the second and third detectors 17 and 18 and the distance travelled upwardly by the tool 14 between the detection of the lower bullet $B_{(n-1)}$ by the third detector 18 and the detection of the upper bullet $B_n$ by the second detector 17.

In FIG. 4, the peaks 34 and 35 correspond to the detection of the upper bullet $B_n$ by the detectors 16 and 17 respectively, and the peak 36 corresponds to the detection of the lower bullet $B_{(n-1)}$ by the detector 18. From a horizontal reference line 37, which may be anywhere below the peaks 34, 35, and 36, the distance C1, C2, and C3 may be measured to corresponding points of the peaks 34, 35, and 36 respectively. The difference between the distances C2 and C1 corresponds to the time between the detection of the same upper bullet $B_n$ by the detectors 16 and 17, the difference between the distances C1 and C3 corresponds to the difference in time between the detection of the upper bullet $B_n$ by the first detector 16 and the detection of the lower bullet $B_{(n-1)}$ by the third detector 18, and the difference between the distances C2 and C3 corresponds to the time difference between the detection of the upper bullet $B_n$ by the second detector 17 and the detection of the lower bullet $B_{(n-1)}$ by the third detector 18.

If an assumption is made that the speed of the tool 14 is substantially uniform within the time interval between the detection of the upper bullet $B_n$ by the first detector 16 and the detection of the same upper bullet $B_n$ by the second detector 17, then this average speed of the tool 14 is the product of the known spacing AS between the detectors 16 and 17 and the time corresponding to the difference between the distances C1 and C2 in FIG. 4. If it is assumed further that the speed of the tool 14 remained substantially the same for the time period that includes the detection of the bullet $B_{(n-1)}$ by the third detector 18, then the distance interval DIST between the upper and the lower bullets $B_n$ and $B_{(n-1)}$ may be obtained by either of the following two procedures: (1) adding the known spacing BS between the second and third detectors 18 to the product of the known spacing AS and the ratio of the difference between the distance C2 and C3 and the difference between the distance C1 and C2 (this means adding the spacing BS to the distance travelled upwardly by the tool 14 between the detection of the lower bullet $B_{(n-1)}$ by the third detector 18 and the detection of the upper bullet $B_n$ by the second detector 17) or (2) adding the sum of the spacings AS and BS shown in FIG. 3 to the product of the spacing AS and the ratio of the difference between the distances C1 and C3 and the difference between the distance C2 and C1 (this corresponds to adding the known spacing between the first and the third detectors 16 and 18 to the distance travelled upwardly by the tool 14 between the detection of the lower bullet $B_{(n-1)}$ by the third detector 18 and the detection of the upper bullet $B_n$ by the first detector 16).

It should be intuitively clear that of these two possible ways to obtain the distance interval DIST between the two adjacent bullets $B_n$ and $B_{(n-1)}$, the one that gives better accuracy is the one that involves using a smaller correction factor, i.e., a smaller value for the product including AS. Stated in a different way, the more accurate method is the one in which the numerator of the discussed ratio is smaller. In the example shown in FIG. 3, the more accurate result is obtained by the second method, i.e., by adding the distance travelled upwardly by the tool 14 between the times the lower bullet $B_{(n-1)}$ is detected by the third detector 18 and the upper bullet $B_n$ is detected by the first detector 16 to the known spacing between the first and third detectors 16 and 18.

Stated in a different notation, the distance interval DIST between the adjacent bullets $B_n$ and $B_{(n-1)}$ may be expressed in accordance with the invention as the sum of the spacing BS between the second and third detectors 17 and 18 and the product of the spacing AS between the first and second detectors 16 and 17 and the sum of a quantity IA and the ratio of the quantities XLO and ALO. The quantity XLO is defined as the smaller of the differences between the distance C2 and C3 and C1 and C3 in FIG. 4, the quantity ALO is defined as the difference between the distances C2 and C1 in FIG. 4, and the quantity IA is 1 when XLO is the difference between the distances C1 and C3, but is 0 when XLO is the difference between the distances C2 and C3.

A portion of the invention involves combining certain quantities by means of an apparatus which comprises a suitable digital computer such as an EMR 6050 or an IBM 360/65. For use by the computer, the signals that are to be combined, i.e., the signals from which the graphs 25, 26, and 27 of FIG. 4 are obtained, are sampled at a regular rate and the digital samples are recorded on the magnetic recorder 23 of FIG. 1.

The magnetic recording consists of a sequence of electrical signals representing numerical values corresponding to the amplitude of the signals illustrated by the curves 25, 26, and 27 at the time of the samples. For example, each signal may be sampled whenever the cable 15 is moved at the Earth surface over a distance of 7.5 mm. On the magnetic recording, the distances C1, C2, and C3 can be expressed as the number of samples (times the distance intervals between samples) from the beginning of the recording or from some arbitrary point on the recording.

The recording obtained from a borehole generally includes several sequences, each sequence corresponding to a certain length of the borehole for which measurements have been obtained by moving the investigating tool 14 continuously. In a specific embodiment of the subject invention, the signals of interest comprising a sequence are combined in the invented manner and the necessary results are obtained before proceeding to another sequence.

While it is possible to carry out the invented combining of signals as these signals are provided by the processing circuit 20 of FIG. 1 and as they are recorded on the magnetic recorder 23, the specific embodiment of the invention which is discussed here starts with electrical signals recorded on tape by the magnetic recorder 23 and combines these signals in the invented manner to obtain the desired results. The specific embodiment of the invention which is disclosed here includes the following four main stages:

1. Examining suitable representations of the electrical signals recorded on the magnetic tape by the recorder 23 to detect the peaks of the detection signals provided by the detectors 16, 17, and 18.

2. Determining the position of an optimal point (e.g., the average point) of each peak and storing suitable representations of an electrical signal representing each of the determined peak point positions in three storage tables TP1, TP2, and TP3, each storage table corresponding to signals resulting from the respectively numbered detector.

3. Examining the representations of electrical signals stored in the tables to determine and to note correctly found peaks, missing peaks, and additional peaks.

4. From the recorded signals and the determinations that have been carried out, obtaining suitable representations of electrical signals representing the quantities ALO, XLO, IA, and possibly another quantity BLO which represents a distance of the type of the distance between the peak 35 and the peak 36 in FIG. 4, and combining these quantities with the known spacings between the detectors 16, 17, and 18, to obtain the distance intervals between selected bullets.

Figure 5:
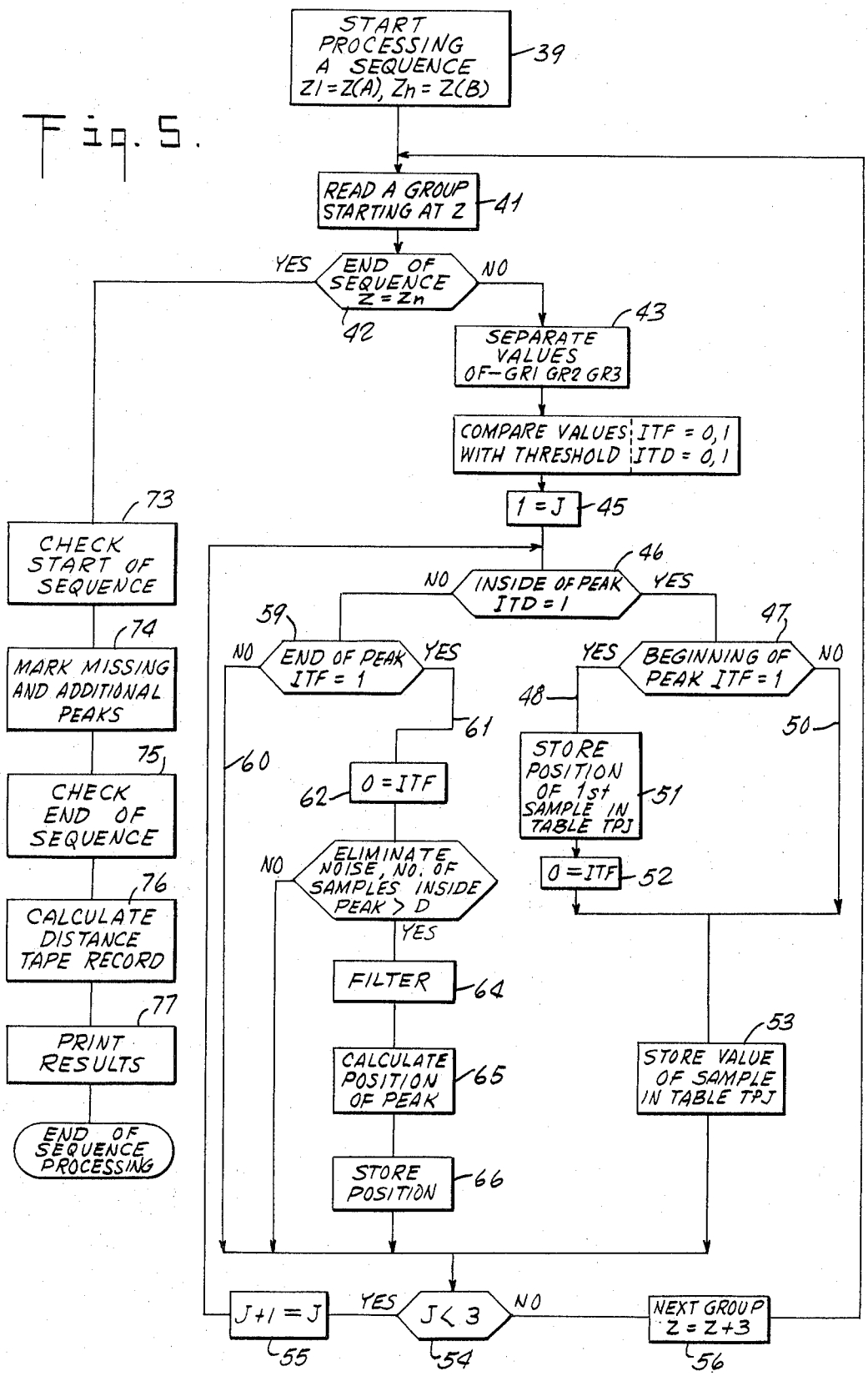
FIG. 5 is a generalized flowchart of combining the signals obtained from the investigating tool in accordance with the invention to obtain the tool speed and the distance intervals between adjacent anomalies.

A simplified and generalized flowchart of the invention is shown in FIG. 5, where the right-hand portion represents the first and second stages and the left-hand portion represents the third and fourth stages is an embodiment of that portion of the invention which is carried out by means of a selected apparatus such as a digital computer. Certain of the steps of the flowchart in FIG. 5 correspond directly to a single digital computer instruction in a conventional high level language, such as PL/1, or at most to a very low number of such instructions, while the remaining steps of FIG. 5, which may require a greater number of instructions in such language, are shown in greater detail in FIGS. 9, 10, and 13 where each step directly corresponds to a single instruction in a high level digital computer language such as Pl/1, or at most to a very low number of such instructions. The combination of the flowcharts of FIGS. 5, 9, 10, and 13 is directly expressable in a conventional high level computer language, such as PL/1, and can be carried out on a conventional digital computer such as an EMR 6050 or an IBM 360/65 after a suitable compiling by a conventional compiler.

Before the start of the procedure shown in FIG. 5, an investigating tool 14 has been lowered into a borehole 10 and then drawn up to derive detection signals by each of the detectors 16, 17, and 18. The detection signals are of the form of the graphs 25, 26, and 27 shown in FIG. 2. Each of these signals has been sampled as described, and electrical signals representing the digital samples have been recorded on magnetic tape by the magnetic recorder 23. A sequence of such digital samples is therefore recorded on magnetic tape. The sequence consists of a plurality of characters, wherein each character is a representation of an electrical signal corresponding to a digital sample.

Referring to FIG. 5, the first of the four stages discussed above is represented by steps 39 through 53.

The processing of a sequence starts at step 39 which represents the necessary conventional operations required to start the reading of a selected sequence of characters recorded on magnetic tape. This step includes defining that the first character of the selected sequence is Z, and that it corresponds to a sample taken for a selected borehole depth Z(A), and that the last character of the selected sequence is $Z_n$ and it corresponds to a sample taken for a selected borehole depth Z(B). Step 41 defines that the group of characters starting at character Z is to be read from the tape. The first time step 41 is reached, the first group of characters is read (Z=Z1), the second time the step 41 is reached, the second group of characters of the sequence is read (Z=Z4), etc. A group of characters is a suitable subset of the sequence, and is, in this example, a group of three successive-in-time samples, one for each of the detectors 16, 17, and 18.

At step 42 a test is made to determine if the end of the sequence which was started at step 39 has been reached. The test is if the current value of Z is equal to $Z_n$, where $Z_n$ is the last character of the selected sequence, as defined in step 39. If the end of the sequence has not been reached, control is transferred to step 43 where the characters resulting from the detection signals from the three detectors 16, 17, and 18 are separated into characters resulting only from the detector 16, characters resulting only from the detector 17 and characters resulting only from the detector 18. If the characters on tape are ordered such that each group consists of a first character for a sample from the detector 16, a second character for a sample from the detector 17 and a third character for a sample from the detector 18, step 43 is unnecessary; if this is not the order of the tape characters of each group, then step 43 places each group in that order.

At step 44 each of the characters that have been separated at step 43 is compared with a defined threshold to determine if the character is greater than the threshold. As a result of this comparison, two quantities are associated with each character. Each of these quantities has a value of either 0 or 1, depending on the comparison. These quantities are labelled ITF and ITD and each may be either 0 or 1 in value. If the character is greater than the threshold, the quantity ITF is 1; if the character is less than the threshold, the value of ITF is 0. The quantity ITD is 1 for a character which occurs after a transition between a character that is lower than the threshold and a character higher than the threshold or a character higher than the threshold and a character lower than a threshold. The value of ITD is 0 for a character which is not after such transitions.

As an example using arbitrary values, if the threshold is 10, the preceding character compared therewith is 8 and the current character is 9, the quantities ITF and ITD associated with the current character are both zeroes. If the preceding character is 9 and the current character is 11, the quantity ITF associated with the current character is 1 and the quantity ITD is also 1. If the preceding character is 12 and the current character is 12, the quantity ITF is 1 and the quantity ITT is 0 for the current character. If the preceding character is 11 and the current character is 9, the quantity ITF is 0 and the quantity ITD is 1 for the current character.

The purpose of the quantities ITF and ITD is to indicate conveniently if the character associated therewith is an electrical signal representing a sample which is inside or outside of a peak, and whether it is at the beginning or at the end of the peak.

Step 45 of FIG. 5 sets to 1 the value of a variable J which denotes one of the three detectors 16, 17, and 18. Thus, the character that results from the first detector 16 is processed first; later, at step 55, which is discussed below, the variable J shown at step 45 is incremented by 1 to start the processing of the character resulting from the second detector 17, etc. At step 46, the quantities ITF and ITD found at step 44 are examined to determine if the character that is currently considered represents a sample that is inside a peak or outside of a peak. If the quantity ITT is 1, then the character represents a sample inside a peak, and the branch to the right of step 46 is taken.

At step, 47, the quantity ITF associated with the current character is examined to determine if the character represents a sample at the beginning of a peak. If the quantity ITF is 1, the answer is "yes" and a branch 48 is taken to step 51. If the quantity ITF associated with the current character is 0, then a branch 50 is taken directly to a step 53.

At step 51, the position of the character representing the first sample of a peak is stored in a suitable storage table TPJ in the computer memory (with J being equal to the value of J for the current character, i.e., either 1, 2, or 3 to correspond to either detector 16 or 17 or 18 respectively) and the quantity ITF associated with that current character is reset to 0. Then, at step 53, which is reached either from step 51 or from step 47, the value of the character representing a sample inside the peak is stored in the same table TPJ. This procedure continues for the character from the first, second and third detectors of a first group of characters. Step 54 determines if characters resulting from the first, second or third detector are currently considered, and step 55 suitably increments the value of the variable J. The same value of J applies to the tables TPJ which are built in steps 51 and 53, with the result that there are three tables TP1, TP2, and TP3 each storing signals associated with the respective one of the three detectors 16, 17, and 18. When the J number examined at step 54 is 3, this indicates that the group read at step 41 has been processed, and a branch is taken to step 56 which increments Z by 3 and returns control to step 41 to start processing the next group through the same procedure.

When the test at step 46 gives a negative answer, i.e., when the character examined at step 46 represents a sample which is outside of a peak, a branch is taken to step 59 for a test whether the character represents a sample which is at the end of a peak or a sample which is simply outside of a peak. If the character examined at step 59 is simply outside of a peak without being the first outside sample after a peak, a return is made to step 54. If the answer at step 59 is yes, i.e., the current character is the first character after the peak, a sequence of steps begins for the purpose of determining an optimal point of interest within the peak. As one example, this optimum point is the average amplitude point within a peak.

The average amplitude point of a peak is found through the procedure of steps 63 to 66, and the information that is utilized for these steps is the information stored in connection with the peak of interest in the corresponding table built in steps 51 and 53. A table of this type is represented in graphic form in FIG. 6.

Figure 6:
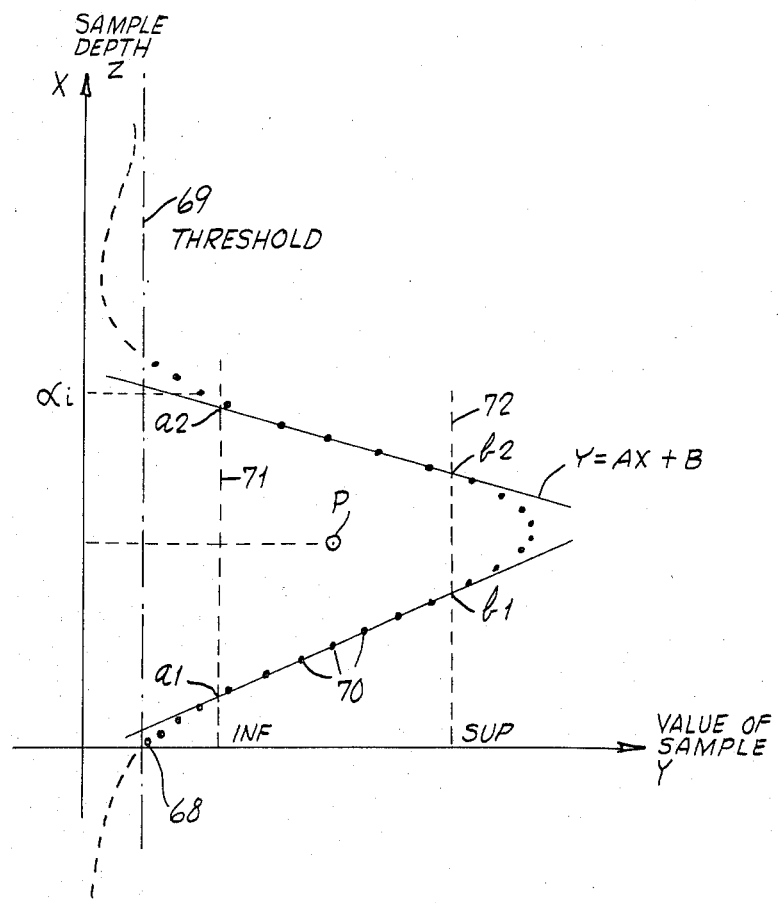
FIG. 6 illustrates a typical peak of a signal from a detector passing an anomaly.

Referring to FIG. 6, the vertical axis X represents the depth at which the samples are taken relative an arbitrary point, such as the Earth surface, while the horizontal axis Y represents the value of the character representing a sample, i.e., the amplitude of the detection signal. As discussed below, the table TPJ which was built in steps 51 and 53 of FIG. 5 and which is represented graphically in FIG. 6 includes representation of electrical signals for the following: the position with respect to the beginning of the sequence of the first sample which is higher than a threshold, the value of that first sample and the value of each subsequent sample of that peak which is above the threshold. In FIG. 6, the first peak sample of which is higher than the threshold is the sample 68, which is just to the right of the threshold line 69. Each of the samples 70 to the right of the threshold line 69 is higher in value than the threshold, and the value of each of these samples is stored in the respective table TPJ.

The procedure represented by the steps 63 to 66 of FIG. 5 are for the purpose of determining the position of the point P illustrated in FIG. 6, this position P being representative of the location of the radioactive bullet which produced the peak. The peaks which result from noise are eliminated at step 63 of FIG. 5. This elimination is based on the recognition that peaks which result from noise generally have a small number of samples. Therefore, at step 63, the number of samples of a peak which are above the threshold is compared with a defined number D chosen to eliminate all but well defined peaks. Then, if the peak remains, each character representing a sample of the peak is replaced at step 64 by the average of the values of the two neighboring characters in order to reduce irregularities stemming from statistical variations of the radioactivity signals from the detectors 16 through 18. The effect of the procedure at step 64 is to smoothen the radioactivity signal from the detector which produces the peak of interest, and the same function may be carried out by a suitable filter.

The actual finding of the position of the average point P of the peak is carried out at step 65. Briefly stated, this includes eliminating the summit and the base of the peak, replacing the flanks of the peak by straight-line segments, and finding the arithmetic means of the X-coordinates of the four ends of these straight-line segments.

The vertical lines 71 and 72 labelled INF and SUP illustrate the cut-off lines for the base and the summit of the peak respectively. These lines may be chosen to be at positions corresponding to 20 and 80 percent of the peak amplitude respectively. Each flank of the peak is then replaced by a straight-line segment chosen by the conventional least squared method of curve-fitting. Then, the X-coordinates of the points $a1$, $a2$, $b1$ and $b2$ are found in a conventional manner and the average of the X-coordinates of these four points gives the X-coordinate of the desired point P, as illustrated in FIG. 6.

The position of the average point P shown in FIG. 6 may be found by other suitable methods. For example, the peak may be divided into two equal areas by a horizontal line, and the point P may be found at the intersection of the diagonals between the point $a1$, and $b1$, and between the points $a2$ and $b1$. Still alternately, the X-coordinate of the point P may be found by finding the X-coordinate of the intersection of the straight-line segments which replace the flanks of the peak.

In general, it is desirable to eliminate the base and the summit of the peak because these are influenced by noise more than the flanks of the peak and to find the average point P geometrically. The point P is used as the position of the peak calculated at step 65 in FIG. 5 and a suitable electrical signal representing P is stored at step 66 of FIG. 5 in the respective table TPJ to replace all other signals for the peak discussed in connection with steps 51 and 53 of FIG. 5. After step 66, step 54 is accessed again for branching as discussed earlier.

When the test at step 42 indicates that the sequence which was started at step 39 is completed, a branch is taken to the third of the four stages discussed earlier. This third stage comprises steps 73, 74, and 75 of FIG. 5. By the time step 73 is reached, there are three tables TP1, TP2, and TP3 in the computer memory corresponding respectively to the three detectors 16, 17, and 18. Each table contains representation of the electrical signals for a total number of peaks NPJ, with the value of J being either 1, 2, or 3 to correspond to the detectors 16, 17, and 18 respectively, and with each row of each table having a position TPJ (i) in relation to the beginning of the sequence started at step 39.

The third stage, which comprises steps 73, 74, and 75, is for the purpose of determining the nature of the peaks stored in the tables TPJ, i.e., if the peaks are correct peaks or additional peaks and if there are missing peaks, and to identify the different types of peaks.

At step 73, the peaks which are at the top of the tables TPJ (i.e., the first-in-time peaks) are examined and are either verified, or the tables are modified to make sure that the first peaks of the three tables TPJ are at approximately the same time level. This is required because several different cases may occur when the investigating tool 14 starts moving upwardly from a given position in the borehole to generate the sequence which is started at step 39 of FIG. 5. These different cases are illustrated in FIGS. 7A through 7E and the resulting recordings are represented respectively in FIGS. 8A through 8E.

Referring to FIGS. 7A and 8A, the investigating tool 14 starts moving upwardly from the indicated position at which a first bullet B1 is between the second and third detectors 17 and 18 and an adjacent upper second bullet B2 is above the first detector 16. The first peak is from the detector 18 and corresponds to the bullet B1, and the first peaks in the tables TP1, TP2, and TP3 are the lowest three peaks in FIG. 8A. This is an acceptable situation, and the group of the three lowest peaks in FIG. 8A may be combined in accordance with the invention to find the distance between the bullets B1 and B2 in FIG. 7A.

In the second case shown in FIGS. 7B and 8B, the first bullet B1 is between the first and second detectors 16 and 17 at the time the tool 14 starts moving upwardly. The first peak recorded in FIG. 8B would therefore be from the detector 17 and is the lowest peak in FIG. 8B. Since a group of three peaks at about the same time level is needed to find the desired results, the single low time-level peak in FIG. 8B must be eliminated and the group of three peaks at about the middle of FIG. 8B must be retained.

For the cases illustrated in FIGS. 7C, 7D, and 7E, the graphs shown in the respective FIGS. 8C, 8D, and 8E each include at their lowest level an insufficient number of peaks for obtaining the desired results. Therefore, in each of the cases shown in FIGS. 8C, 8D, and 8E, only the peaks of the higher time-level are useful, and the peaks of the lower time-level must be eliminated. The purpose of the procedure of step 73 of FIG. 5 is therefore to eliminate from the Tables TPJ any peaks of the type that are at the lower time-level of FIGS. 8B, 8C, 8D, and 8E. This procedure is shown in detail in FIG. 9.

Figure 9:
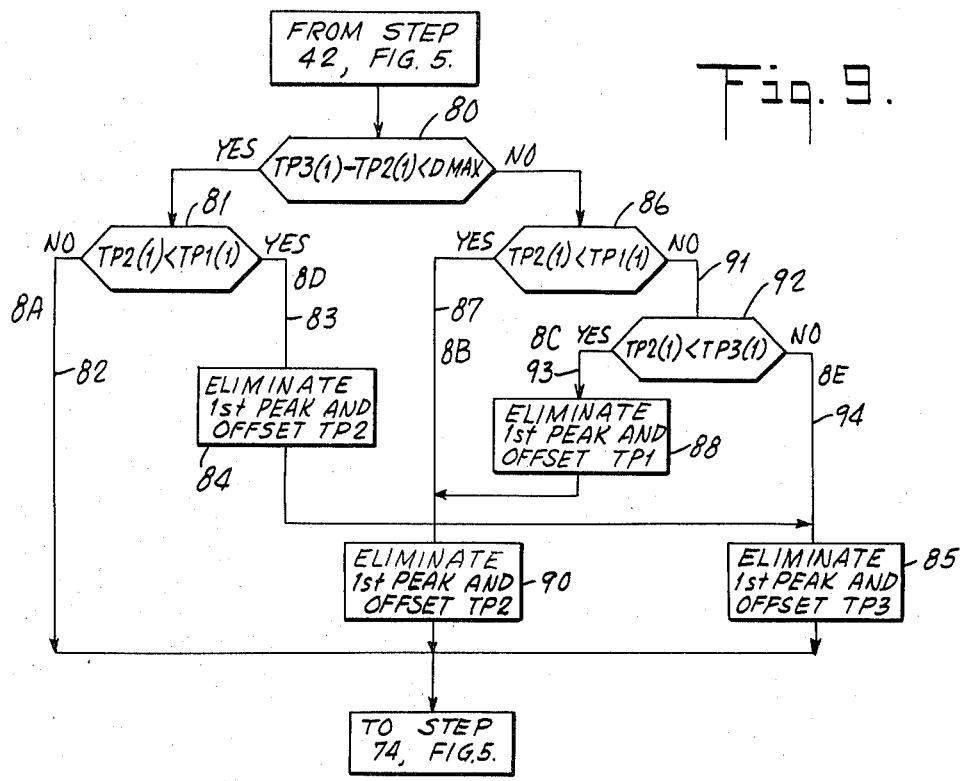
FIG. 9 is a more detailed flowchart of a portion of the procedure of FIG. 5.

Referring to FIG. 9, the first test at step 80 is to determine if the distance between the first peaks in the second and third tables TP2 and TP3 (the tables corresponding to the second and third detectors 17 and 18) is smaller than a chosen suitable maximum dispersion DMAX of the distances between adjacent bullets. The value for DMAX is arbitrarily chosen and may, for example, be 3.5 meters. If the answer at step 80 of FIG. 9 is yes, this indicates one of the cases illustrated at FIGS. 8A and 8D; while a "no" answer at step 80 of FIG. 9 indicates one of the cases shown at FIGS. 8B, 8C and 8E.

After a yes answer at step 80 of FIG. 9, a test is made at step 81 to differentiate between the situations in FIGS. 8A and 8D. If the answer at step 81 is no, this indicates the case shown at FIG. 8A, while a yes answer at step 81 indicates the case illustrated at FIG. 8D.

If the answer at the test of step 80 is no, a test is carried out at step 86 to differentiate between the cases illustrated in FIG. 8B, on the one hand, and the cases illustrated in FIGS. 8C and 8E on the other hand. A yes answer at step 86 indicates the case of FIG. 8D, while a no answer at step 86 indicates that one of the cases shown at FIGS. 8C and 8E exists.

To differentiate between the cases shown at FIGS. 8C and 8E, a test is carried out at step 92. A yes answer at step 92 indicates the case shown at FIG. 8C, while a no answer at step 92 of FIG. 9 indicates the case shown in FIG. 8E.

The branch 82 from the test of step 81 in FIG. 9 indicates the acceptable case, i.e., the case shown at FIG. 8A, and nothing further need be done for step 73 of FIG. 5. Any other branches from the tests at steps 81, 86 and 92 of FIG. 9 indicate the cases shown at FIGS. 8B through 8E, and the undesirable and unutilizable peaks at the low time-levels of these figures must be eliminated. Thus, branch 83 from the test 81 corresponds to FIG. 8D, and the first two peaks of the Tables TP2 and TP3, which correspond respectively to the two low time-level peaks of FIG. 8D are eliminated at steps 84 and 85 respectively. Similarly, if the branch 87 is taken from the test 86, this corresponds to the case of FIG. 8B and the single low time-level peak is eliminated by eliminating the first peak of the Table TP2 at step 90. The branch 93 from step 92 is the case illustrated at 8C, and the two low time-level peaks of FIG. 8C are eliminated by eliminating the first peaks of the tables TP1 and TP2 at steps 88 and 90 respectively. The branch 94 of step 92 corresponds to the case of FIG. 8E, and the undesirable single peak at the low time-level of FIG. 8E is eliminated by eliminating the first peak of Table TP3.

When the first peak of a table is eliminated at any of the steps 84, 88, 85 and 90, the table is suitably offset to fill in the space vacated by the eliminated peak.

After the procedure of FIG. 9, a return is made to step 74 of FIG. 5 to mark any missing or additional peaks. This involves determining whether there are missing or additional peaks in each of the tables TPJ and assigning to each peak an index IPJ(i) which allows identification of the different types of peaks. This index takes the following values, with the following significance attached to these values: 1 for a correct peak, 2 for a missing peak, 3 for an additional peak, 5 for an additional peak resulting from an actual additional bullet, and 7 for a missing peak from an actual missing bullet.

Figure 10:
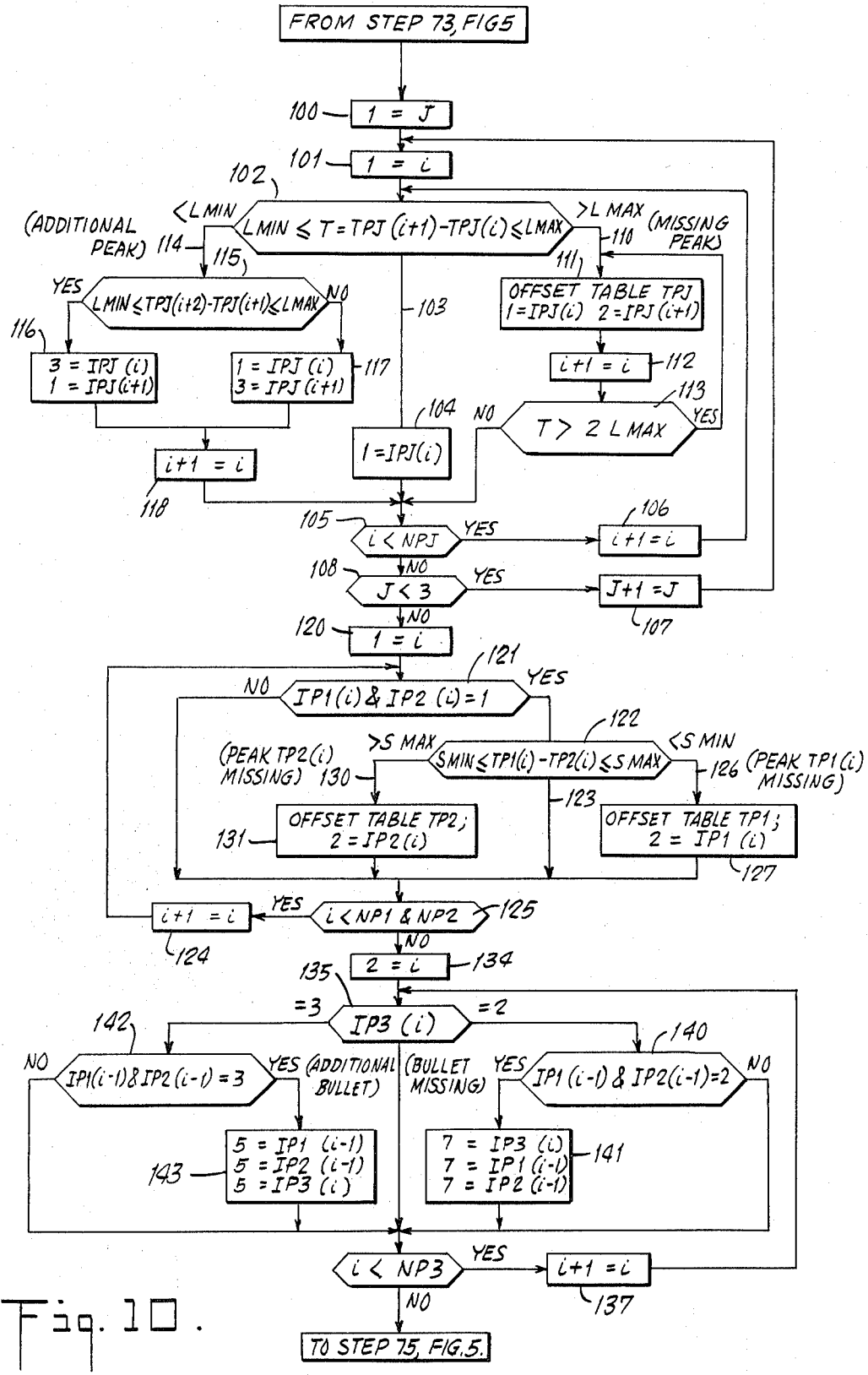
FIG. 10 is a more detailed flowchart of another portion of the procedure of FIG. 5.

This procedure of step 74 of FIG. 5 is illustrated in greater detail in FIG. 10, and includes three phases. During the first phase, for each of the tables TPJ, the difference T between the positions of the points P of two successive peaks $i$ and $(i + 1)$ is found. If this difference T is greater than a maximum limit LMAX, which, for example, may be 15 meters, the conclusion is that there is a missing peak. If this difference T is less than a minimum limit LMIN, which may be chosen to be 8 meters, the conclusion is that an additional peak is present. Any peaks which are between these limits LMAX and LMIN are considered to be correct peaks.

Referring to FIG. 10, steps 100 and 101 specify the first table TPJ which is to be examined and the first row of that table which is of interest, and at step 102, the actual comparison is carried out between the selected adjacent peaks of the selected table. If the difference T is correct, exit 103 is taken from the test at step 102, the lower of the two examined peaks is assigned the index 1 at step 104, and a return is made to examine the next pair of adjacent peaks in the same table, provided a test at step 105 determines that there are remaining peaks in the table, and after incrementing the table row of interest at step 106. The test at step 108 determines when all three tables TPJ have been so examined, while incrementing at step 107 causes the examination of the next table when one table has been processed.

If the difference T between two adjacent peaks in the same table TPJ is too great, exit 110 is taken from step 102, and at step 111 the table TPJ in which the two compared peaks are is offset by one peak position, the lower of the two compared peaks is assigned an index 1, a dummy peak is inserted in row $(i + 1)$ of the table TPJ and that inserted peak is assigned an index 2. Then, the distance between the peaks of rows $(i + 2)$ and $(i + 3)$ of the same table TPJ is examined by two successive offsets made in steps 112 and 106. In step 113, a test is made to see if the difference T is greater than twice the limit LMAX, and if so, a return is made to step 111 to insert in the table TPJ a second dummy peak which is assigned an index 2.

If the difference T between the positions of the two peaks tested at step 102 is too small, this indicates that an additional peak is present, and the exit 114 is taken from step 102 for an attempt to determine whether this additional peak is the upper or the lower peak of the considered distance. The difference between the positions of the peaks of the immediately higher-in-time row $(i+1)$ and the row $(i+2)$ is then examined at step 115. If this second difference is correct, the upper peak of row $(i + 1)$ is considered to be correct and is assigned the index 1, while the lower peak of row $i$ is considered to be an additional peak and is assigned the index 3 at step 116. However, if this second difference is not correct, the lower peak of row $i$ is considered to be correct and is assigned the index 1 at step 117, while the upper peak of row $(i + 1)$ is considered to be an additional peak and is assigned the index 3. Then, the distance between the peaks of rows $(i + 2)$ and $(i + 3)$ is examined in a similar manner after incrementing the value of $i$ in steps 118 and 106.

In a second phase of stage 3, the relative positions of the points P of the two peaks of the same rows of the tables TP1 and TP2 are compared to check that the distance between them roughtly represents the distance AS between the first and second detectors 16 and 17. Two limits SMIN and SMAX are chosen and may be equal, for example, to the spacing AS ± 10 percent expressed in the number of tape characters representing samples, and a check is made to see if the positions of the peaks of the same rows $i$ of the tables TP1 and TP2 is between these limits SMIN and SMAX. If the difference between the examined peaks is too small, the considered peak of table TP1 is missing. If the difference is too great, it is the considered peak of table TP2 which is missing.

Referring to FIG. 10, beginning with the first peak at step 120, and after testing at step 121 to make sure that only correct peaks will be considered, that is, those peaks that are assigned an index 1, the test discussed in the preceding paragraph is carried out in step 122. If the distance between the peaks in the considered rows of table TP1 and TP2 is correct, exit 123 is taken and step 124 returns to the test of step 121 after incrementing the row which is to be considered. This goes on until the end of the tables TP1 and TP2 are reached, as determined at step 125.

If the distance between the considered peaks of the tables TP1 and TP2 is smaller than SMIN, exit 126 is taken from step 122, and, at step 127, the table TP1 is offset, a dummy peak is inserted in row $i$ thereof and this dummy peak is assigned the index 2. If the distance between the considered peaks of the tables TP1 and TP2 is greater than SMAX, exit 130 is taken from step 122, and at step 131, the table TP2 is offset, a dummy peak is introduced at row $i$ of TP2 and is assigned an index 2.

Figure 11:
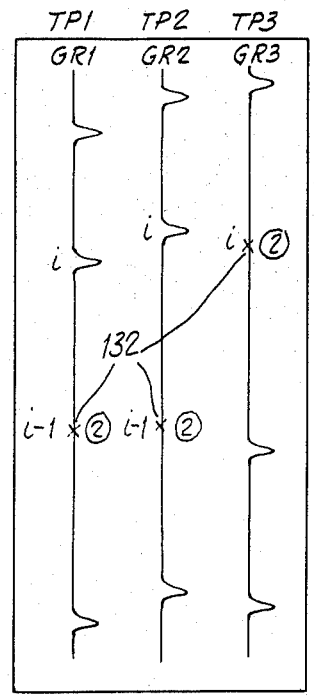
FIGS. 11 and 12 represent graphs obtained from the detectors of the investigating tool in the case of a missing anomaly and in the case of an additional anomaly respectively.
Figure 12:
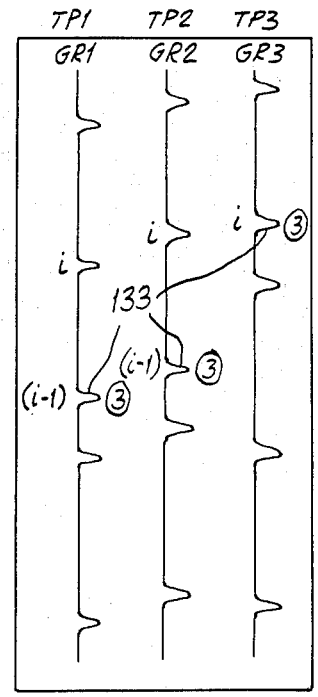

In a third phase of stage 3 of the invented procedure, the information of interest is whether the missing and additional peaks discussed above actually correspond to missing bullets or additional bullets. For an explanation of the situations that may be involved, reference is made to FIGS. 11 and 12 which represent respectively the configuration of graph curves in the case of a missing bullet 132 and in the case of an additional bullet 133. By anology, in the case of a missing bullet, we will find a missing peak in the table TPJ, that is a dummy peak assigned an index 2 at the row $(i-1)$ in the tables TP1 and TP2 and at the row $i$ in the table TP3. Likewise, in the case of an additional bullet, we will find an additional peak assigned an index 3 at the row $(i-1)$ in the tables TP1 and TP2 and at the row $i$ in the table TP3.

Referring back to FIG. 10, the index of the peak of row $i$ in table TP3 is examined at step 135, beginning with the second row, as set by step 134. If this index is 1, the next peak is examined at step 137, until the end of the table TP3, which is detected at step 136. If the index of an examined peak at row $i$ of the table TP3 is 2, the indices of the peaks of rows $(i - 1)$ in the tables TP1 and TP2 are examined at step 140. If these two indices are 2, they are replaced by the index number 7 at step 141, and the same is done for the index of the considered peak of table TP3. If the index of the peak at row $i$ of table TP3 is found to be 3 at step 135, the indices of the peaks of rows $(i - 1)$ in the tables TP1 and TP2 are examined at step 142. If the examined two indices are 3, they are replaced by the index 5 at step 143, the same being done for the index of the considered peak of table TP3. The operations of step 74 in FIG. 5, that is the study of the tables TPJ during a sequence, is thus completed, and a return is made to step 75 of FIG. 5.

The third phase of stage 3 of the invented procedure involves examining the end of the sequence that is being considered. This is step 75 of FIG. 5, and it is designed to check the last peaks of each table TPJ. Since the procedures that are carried out subsequently end when the last peak of table TP3 is reached, it is sufficient to check that at the end of the sequence we have, in tables TP1 and TP2, a peak coming from a bullet immediately over the one which gave the last peak of table TP3. The only two unfavorable cases are the absence of such a peak either in both tables TP1 and TP2 or in table TP2 alone. Thus, step 75 of FIG. 5 consists of comparing the number of peaks NP2 and NP3 in tables TP2 and TP3. If NP3 is higher than NP2, NP3 is replaced by the number of peaks NP2. The third stage of the invented procedure is then completed.

In the fourth stage of the invented procedure, which is represented by steps 76 and 77 in FIG. 5, three peaks are selected, one from each of the tables TPJ, and the quantities ALO, XLO, IA and BLO, which have been defined earlier are found, and then the exact distance DIST between each pair of adjacent anomalies (bullets) is found. The results are recorded on a magnetic tape and are printed on a list. The results which are recorded on tape include, for each pair of adjacent anomalies, in addition to the values of the quantities ALO, XLO, BLO, IA and DIST, the number of the distance interval NUI (the number of the interval between two adjacent anomalies), the number of the lower bullet NUB and the depth PRO of the upper bullet.

Figure 13:
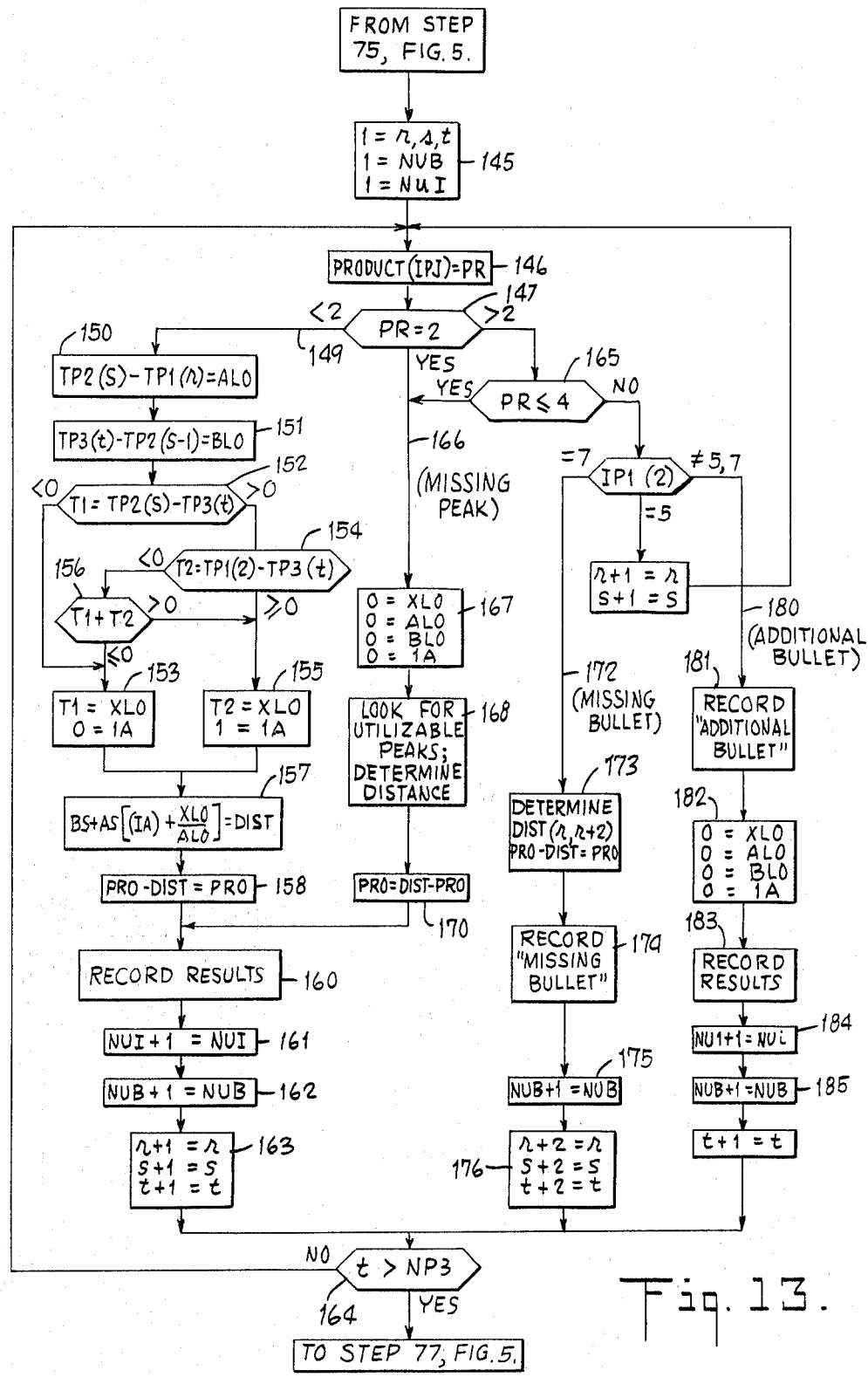
FIG. 13 is a detailed flowchart of a still another portion of the procedure of FIG. 5.

The procedure which is represented by step 76 in FIG. 5 is shown in detail in FIG. 13. The symbols $r$, $s$, and $t$ designate the rows of the three peaks selected respectively from tables TP1, TP2, and TP3. The procedure begins by taking the first peak of each table, so as to conser the deepest pair of adjacent anomalies. The distance between this deepest pair and the lower bullet thereof are each assigned the number 1 at step 145. The product PR of the indices of the selected peaks is calculated at step 146. If this product PR is 1, exit 149 is taken from step 147, indicating that the three considered peaks are all correct. At step 150 the value ALO is calculated by finding the difference between the positions of the peaks in tables TP1 and TP2. The quantity BLO is also found by finding the difference between the positions of the considered peak of table TP3 and the position of the peak of the prior row in table TP2 at step 151. This value BLO may be used to calculate the distances AS and BS when measurements are taken in a calibration well in which the intervals between adjacent anomalies are accurately known.

Then, at step 152, the difference T1 between the positions of the selected peaks of tables TP2 and TP3 are calculated, and, if this difference T1 is negative or zero, that is if the peak of table TP3 is over, or at the level of, the peak in the table TP2, the value of the quantity XLO is set to the value of T1 and the value of the quantity IA is set to zero at step 153. If the quantity T1 is positive, that is if the peak of table TP3 is under the peak of table TP2, the quantity T2 is calculated as the difference between the positions of the peaks TP1 and TP3 at step 154. If this distance T2 is positive or zero, i.e., if the peak of table TP1 is over the peak of table TP3, the quantity XLO is set to the value of T2 and the quantity IA is set to 1 at step 155.

If the distance T2 is negative, that is if the peak of table TP3 is between the peaks of tables TP1 and TP2, the position of the peak of table TP3 in relation to the midpoint between the peaks of tables TP1 and TP2 is examined. To do this, the sum of the quantities T1 and T2 is found at step 156. If this sum is positive, the peak of table TP3 is closer to the peak of table TP1 than to that of table TP2, and the value of XLO is set to the value of T2 and the value of IA is set to 1. In the opposite case, the value of XLO is set to the value of T1 and the value of IA is set to 0. Then, the distance between the two anomalies of interest is found at step 157 as the sum between the known distance BS between the second and third detectors 17 and 18 and the product of the spacing AS between the first and second detectors 16 and 17 and the sum of the quantity IA and the ratio of the quantities XLO and ALO.

The depth PRO of the upper bullet of the considered pair of bullets is found at step 158 by subtracting the last found distance DIST from the preceding value of PRO, and the results are recorded at step 160. These results include the values of the quantities ALO, BLO, XLO, IA, DIST, PRO, NUI and NUB. The recording is on a suitable magnetic tape and may additionally include a recording on a printer.

Then, the number NUI is offset by 1 at step 161, the number NUB of the lower bullet of the pair of bullets of interest is also offset by 1 at step 162, and so are the rows $r$, $s$, and $t$ of the considered peaks at step 163. Then, the distance between the next upper pair of bullets is considered until the row $t$ of the considered peak of table TP3 is equal to the total number NB3 of peaks in this table as determined at step 164.

If the product PR of the indices of the considered peaks is 2 or 4, as determined at step 165, then one or two peaks are missing, and exit 166 is taken. No calculations producing accurate results are possible, and the quantities XLO, ALO, BLO and IA are all set to zero at step 167. It is possible, however, to find an approximate distance between adjacent bullets by using the table TPJ which has no missing peak and converting the distance between the appropriate adjacent peaks of that table to units of distance between the anomalies giving rise to these peaks. This is done at step 168 and makes it possible to calculate the depth PRO of the upper bullet of the considered interval between adjacent bullets at step 170. The results are then recorded at step 160 and the following distance interval is examined at steps 161, 162, and 163.

If the product of the indices is greater than 4, then one of the considered peaks corresponds to a missing bullet or an additional bullet. In this case, the index of the peak of table TP1 is examined at step 171. If this index is 7, exit 172 is taken. This indicates that a missing bullet is involved, and that it is impossible to calculate accurately a distance for the interval of interest. It is possible, however, to calculate an approximate value of the interval $(r, r + 2)$ in table TP1 and to deduce the depth PRO of the bullet located immediately above the interval that is considered. This is done at step 173. On the tape, only a "missing bullet" indication is recorded at step 174, and the following interval is examined by offsetting by two units the rows $r$, $s$, and $t$ of the peaks in tables TP1, TP2, and TP3 at step 176. The number NUB of the next bullet is offset only by 1 unit at step 175.

If the index of the peak in table TP1 is 5, the peaks of tables TP1 and TP2 correspond to an additional bullet, and it is necessary to consider the following peaks of these two tables. This is carried out at step 177, where $r$ and $s$ are offset by 1 unit.

If the index of the peak in table TP1 is different from 5 and from 7, this is exit 180 from step 171, the considered peak of table TP3 corresponds to an additional bullet. In fact, the product PR of the indices is greater than 4 and the index of the considered peaks of tables TP1 and TP2 can only be 1 or 2, since the indices 3 which stand for additional peaks do not exist, having been replaced by the indices 5 earlier. Consquently, the index of the peak of table TP3 can only be 5 or 7, this latter possibility being eliminated by the double offsetting at step 176. On the magnetic tape, an "additional bullet" indication is thus recorded at step 181. Moreover, 0 values for XLO, ALO, BLO and IA are recorded on the tape at step 182 and step 183. Then, the following interval is examined by offsetting by 1 unit the interval number at step 184, the bullet number at step 185 and the row $t$ of the peak of table TP3 at step 186.

Regarding the aspect of the invention that relates to finding the speed of the tool 14 over selected time intervals, it is noted that step 150 of FIG. 13 provides the value of a quantity which, when divided by the known short spacing between the detectors 16 and 17, provides an indication of the speed of the tool 14. The quantity ALO whose value is found at step 150 of FIG. 13, corresponds to the time elapsed between the detection of the same anomaly by the detectors 16 and 17. This time, when divided by the spacing AS between the detectors 16 and 17, gives the actual speed of the tool 14 over that time interval. It is noted that the detectors 16 and 17 may be spaced apart by any suitable distance; for example, these detectors may be at opposite ends of the tool 14. It is also noted that the anomalies detected by the detectors 16 and 17 need not be radioactive bullets or casing joints, but may be any other clearly identifiably anomalies, such as interfaces between different formation layers or changes in any measured borehole parameter.

We claim:

1. In Earth formation measurements, a method of measuring the distance intervals between anomalies arranged in a sequence along a borehole traversing the formation, comprising the steps of:
   a. providing a first, second and third anomaly detector and maintaining the first and second detectors at a defined relatively small spacing from each other and the third detector at a defined relatively great spacing from the first and the second detectors;
   b. moving the detectors along the borehole to traverse said anomalies and to obtain a detection signal peak from each detector at the time it traverses an anomaly;
   c. generating signals representing the time of occurrence of the detection signal peaks from the first and second detectors for the same anomaly and combining, by means of defined apparatus, the generated signals with a signal representing said small spacing between the first and second detectors to obtain a speed signal representing the speed of the detectors relative to the borehole between the occurrence of the two last recited detection signal peaks;
   d. generating a signal representing the time of occurrence of the detection signal peak from the third detector for an anomaly adjacent to the anomaly for which the last recited signal peaks from the first and second detectors are obtained and combining, by means of a defined apparatus, the last recited time signal with at least a subset of the other recited signals, said subset including a signal representing at least one of said small and great spacing between the detectors, to obtain the distance interval between said adjacent anomalies; and
   e. repeating steps (c), (d) and (e) for successive pairs of adjacent anomalies to obtain a plurality of distance intervals between anomalies.

2. A method as in claim 1, including the following steps, each of which is performed by means of a defined apparatus including a storage memory:
   storing electrical signals representing the relative positions of said peaks in a first, second and third tables in said storage memory corresponding respectively to peaks derived from the first, second and third detectors;
   examining the signals representing the peaks stored in each of the tables to find groups of three peaks, one from each table, with the peak representing signals in the first and the second tables of a group derived for the same anomaly by the first and second detectors and with the third peak of the same group derived for an adjacent anomaly by the third detector; and
   combining the signals representing the three peaks of each group with each other and with a signal representing at least one of the spacings between the detectors to find said distance interval between said adjacent anomalies.

3. A method as in claim 2 wherein said examining step includes defining acceptable peak position ranges in the tables, examining said ranges and removing from the tables signals representing peaks which are outside said ranges and inserting peak representing signals at acceptable ranges in the tables which do not contain such peak representing signals to thereby form additional groups of three peaks, one in each table, with the peaks of a group in the first and second tables corresponding to a single anomaly and with the peak of the same group in the third table corresponding to an adjacent anomaly.

4. A method as in claim 3 including comparing the signals representing the peaks with a threshold parameter and storing in the tables only the peaks which satisfy the comparison.

5. A method as in claim 4 including finding the position of a selected point of each peak and storing in the tables signals representing said selected points.

6. A method as in claim 1 wherein said anomalies are substantially uniformly spaced from each other at distance intervals which are of the order of said great spacing between the third detector and the first and second detectors.

7. A method as in claim 6, including the following steps, each of which is performed by a defined apparatus including a storage memory:
   comparing each of said peaks with a threshold parameter and retaining only the peaks which satisfy the comparison;
   finding the position of a selected point of each peak;
   storing electrical signals representing said selected positions of the retained peaks in a first, second and third tables in said storage memory corresponding respectively to peaks derived from the first, second and third detectors;
   examining electrically represented signals for the peaks stored in each of the tables, defining acceptable peak positions in the tables, removing from the tables signals representing peaks which are outside said acceptable positions and inserting peak representing signals at acceptable positions in the tables that do not contain such signals to form thereby groups of three peaks, one in each table, each group consisting of a peak in the first table and in the second table derived from the same anomaly by the first and the second detectors and a peak in the third table derived from an adjacent anomaly by the third detector; and
   combining signals representing the peaks of a group with each other and with a signal representing at least one of the spacings between the detectors to find the interval between said adjacent anomalies.

8. A method as in claim 1 including the step of comparing, by means of a defined apparatus, each of the peak representing signals with a defined threshold and combining, in said combining step, only those peak representing signals that satisfy the comparison.

9. A method as in claim 1 including finding, by means of a defined apparatus, a selected point of each of said peak representing signals and combining, in said combining step, signals representing the found selected points of the peak representing signals.

10. In Earth formation subsidence measurements, a method of measuring the intervals between radioactive bullets located in a substantially uniform pattern along a borehole traversing the Earth formation, comprising the steps of:
providing a first, second and third radioactivity detectors and maintaining the first and second detectors at a relatively small spacing from each other and the third detector at a relatively great spacing from the first and second detectors;
moving the detectors along the borehole to obtain a radioactivity detection signal from each detector, said detection signals including peaks corresponding to the detector traversing the vicinity of a radioactive bullet;
generating signals representing the time of occurrence of said peaks from the first and second detectors for the same radioactive bullet and combining, by means of a defined apparatus, the generated signals with a signal representing said small spacing between the first and second detectors to obtain a speed signal representing the speed of the detectors relative the borehole between the occurrence of the two peaks;
generating a signal representing the time of occurrence of a peak from the third detector for a bullet adjacent to the bullet for which the last recited peaks from the first and the second detectors are obtained and combining, by means of defined apparatus, the last recited time signal with at least a subset of the other recited signals, said subset including a signal representing at least one of said small and great spacing between the detectors, to obtain the distance interval between said adjacent radioactive bullets; and
repeating the last recited three steps for successive pairs of adjacent bullets to obtain a plurality of distance intervals therebetween.

11. A method as in claim 10 wherein said combining steps include the following substeps, each of which is performed by means of a defined apparatus including a storage memory:
storing electrical signals representing the relative positions of said peaks in a first, second and third tables in the storage memory corresponding respectively to the peaks deriving from the first, second and third detectors;
examining the signals representing the peaks stored in each of the tables to find groups of three peaks, one from each table, with the peaks in the first and second tables of a group derived by the detection of the same anomaly by the first and second detectors and the third peak in the same group derived by detecting an adjacent anomaly by the third detector; and
combining the stored signals representing the peaks of successive groups with each other and with a signal representing at least one of said spacings between the detectors to find the interval between said adjacent anomalies.

12. A method as in claim 11 wherein the examining step includes defining acceptable peak positions in the tables, and removing from the tables signals representing peaks which are outside said acceptable positions and inserting peak representing signals at acceptable positions in the tables that do not contain such peak representing signals, to thereby form additional groups of three peaks, one in each table, with each group consisting of a peak for the same bullet from the first and second detectors and a peak for an adjacent bullet from the third detector.

13. A method as in claim 12 including comparing the signals representing the peaks with a threshold parameter and storing in the tables only signals representing the peaks which satisfy the comparison.

14. A method as in claim 13 including finding the position of a selected point of each peak and storing in said tables signals representing the positions of said selected points of the peaks.

15. A method as in claim 14 wherein said selected point of a peak corresponds to the geometric average of the peak amplitude.

16. A method as in claim 10 including comparing the peak representing signals with a defined threshold parameter by means of a defined apparatus and combining, in said combining step, only the peak representing signals which satisfy the comparison.

17. A method as in claim 10 including finding, by means of a defined apparatus, the position of a selected point of each peak representing signal and combining, in said combining step, signals representing the found selected points of the peak representing signals.

18. In earth formation measurements, a method of detecting the speed of an investigating tool moved along a borehole traversing in Earth formation having anomalies, comprising the steps of:
providing an investigating tool having a first and a second detector for detecting Earth formation anomalies and maintaining the first and second detectors at a defined known spacing from each other;
moving the investigating tool along the borehole to traverse said anomalies and to provide a detection signal peak for each traversal of an anomaly;
combining, by means of a defined apparatus, signals representing detection signal peaks from each of the detectors for the same anomaly and a signal representing the known spacing between the detectors to generate a signal indicative of the average speed of the investigating tool with respect to the borehole over the time interval between the last recited two peaks.

19. A method as in claim 18 including comparing each peak representing signal with a defined threshold and combining, in said combining step, only the peak representing signals which satisfy the comparison.

20. A method as in claim 19 including finding, by means of a defined apparatus, a selected point of each peak representing signal and combining, in said combining step, signals representing the found selected points of the peak representing signals.

21. A method as in claim 20 wherein said defined apparatus includes a computer memory and wherein the combining step includes storing in said computer memory electrical signals representing the found selected points of the peak representing signals and signals representing the relative times of occurrence of the stored peak representing signals, and combining the stored signals to find the average speeds of the investigating tool over a succession of time intervals each defined by the relative time of occurrence of two peaks, one from each detector, for the same anomaly.

* * * * *